(12) United States Patent
Pragada et al.

(10) Patent No.: US 8,214,392 B2
(45) Date of Patent: ***Jul. 3, 2012

(54) DOMAIN INDEPENDENT SYSTEM AND METHOD OF AUTOMATING DATA AGGREGATION

(75) Inventors: Sreenivasa R Pragada, Tarrytown, NY (US); Viswanath Dasari, Alpharetta, GA (US)

(73) Assignee: Semantifi, Inc., Stanford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/976,889

(22) Filed: Dec. 22, 2010

(65) Prior Publication Data

US 2011/0145253 A1    Jun. 16, 2011

Related U.S. Application Data

(63) Continuation of application No. 11/926,519, filed on Oct. 29, 2007, now Pat. No. 7,885,972.

(60) Provisional application No. 60/855,321, filed on Oct. 30, 2006.

(51) Int. Cl.
*G06F 17/30* (2006.01)
(52) U.S. Cl. ...................................................... 707/776
(58) Field of Classification Search ................. 707/600, 707/708, 776
See application file for complete search history.

(56) References Cited

U.S. PATENT DOCUMENTS

| | | | |
|---|---|---|---|
| 6,438,537 B1 | 8/2002 | Netz et al. ...................... 707/3 |
| 6,654,764 B2 | 11/2003 | Kelkar et al. ................. 707/102 |
| 7,120,624 B2 | 10/2006 | Chaudhuri et al. .................. 1/1 |
| 7,181,450 B2 | 2/2007 | Malloy et al. ..................... 707/4 |
| 7,269,786 B1 | 9/2007 | Malloy et al. ................. 715/212 |
| 7,610,329 B2 | 10/2009 | Bone et al. ..................... 709/201 |
| 2002/0198858 A1 | 12/2002 | Stanley et al. .................. 706/50 |
| 2003/0208457 A1* | 11/2003 | Iyengar ............................. 707/1 |
| 2004/0088323 A1* | 5/2004 | Elder et al. ................ 707/103 Y |
| 2004/0122820 A1 | 6/2004 | Malloy et al. ..................... 707/6 |
| 2005/0149491 A1 | 7/2005 | Bakalash et al. .................. 707/2 |
| 2006/0005121 A1 | 1/2006 | Berger et al. ................. 715/513 |
| 2006/0106847 A1* | 5/2006 | Eckardt et al. ................ 707/101 |

* cited by examiner

*Primary Examiner* — Robert Timblin
(74) *Attorney, Agent, or Firm* — Gordon Kessler

(57) ABSTRACT

A computer automated method and system of presenting data. The method may include the steps of inputting a set of user-defined instructions into a remotely located computer database system via a public network connection, inputting a user query into the computer database system via the public network connection, mining the computer database system for data relevant to the user query, creating a data set comprising the data relevant to the user query, and aggregating data in the data set using domain metrics selected based on any of predefined and configurable rules and past user usage. The aggregation may further include tagging all data attributes in the data set based on database metadata and inputs from a user, wherein the data attributes comprise any of data identifications (IDs), data grouping attributes, and data measure attributes.

21 Claims, 8 Drawing Sheets

DOMAIN INDEPENDENT SYSTEM AND METHOD OF AUTOMATING DATA AGGREGATION

CROSS REFERENCE TO RELATED APPLICATIONS

This application is a continuation application of U.S. patent application Ser. No. 11/926,519 filed Oct. 29, 2007, titled "A DOMAIN INDEPENDENT SYSTEM AND METHOD OF AUTOMATING DATA AGGREGATION AND PRESENTATION", currently pending, which in turn claims the benefit of U.S. Provisional Patent Application No. 60/855,321 filed on Oct. 30, 2006, the contents of which in their entireties are herein incorporated by reference.

BACKGROUND

1. Technical Field

The embodiments herein generally relate to database reporting, and, more particularly, to the process of data aggregation and presentation.

2. Description of the Related Art

There are several techniques of retrieving useful information from a multitude of detailed data in a computer database or any other data repository. Sometimes, when the data is limited, looking through all of the detailed data is sufficient. However, when the amount of data is large in the order thousands or millions or larger number of records, looking through detailed data may not be effective or useful. Detailed data can be aggregated based on information needs and domain expertise so it can be better managed and understood. Finally, depending on the type of data, different tabular or graphical presentations can be selected to review and understand the data. Given multiple presentations the user can quickly glance and choose the presentation that best suits the user's needs.

Conventional solutions to aggregating detailed data include: (1) the use of database metadata such as dimensional columns of summary level data or multi-dimensional databases (MDDBs); (2) the use of database metadata in lookup values of database key information; for example, aggregating on Product Description or Product ID; and (3) the use of relying on the grouping clause of the structured query language (SQL). Generally, these methods are sufficient to aggregate detailed data for user queries such as "Sales by Product". Most important, these methods require a SQL query indicating which attributes have to be grouped. For instance, it is fairly obvious to someone skilled in the art to take a SQL such as with the explicit grouping information such as "Select AccountID, ProductID, ProductDescription, Sales from Table(s) Group By Product" and produce reports.

However, these methods can aggregate detailed data when the SQL query input to the system is generic such as "Select AccountID, ProductID, ProductDescription, Sales from Table" and no additional information from user or database metadata is available. Another example of a challenge is with a user query such as "Revenue by Sales" where the result set is large for manual review and no meta information is available. Such a query may be converted to "Select Revenue, AccountID from Table(s) Group By Sales". If the result set has thousands of records and "Sales" has 5,000 unique values, then the aggregate result will have 5,000 records, which may not meaningful or useful or timely for understanding business information. Accordingly, there remains a need for a novel system and method for aggregating and presenting data to a user that overcomes the limitations of the conventional approaches.

SUMMARY

In view of the foregoing, an embodiment herein provides a computer automated method of aggregating and presenting data, and a program storage device readable by computer, tangibly embodying a program of instructions executable by the computer to perform the automated method of aggregating and presenting data, wherein the method comprises inputting a set of user-defined instructions into a computer database system; inputting a user query into the computer database system; mining the computer database system for data relevant to the user query; creating a data set comprising the data relevant to the user query; and aggregating data in the data set using domain metrics selected based on any of predefined and configurable rules and past user usage, wherein the aggregation comprises tagging all data attributes in the data set based on database metadata and inputs from a user, wherein the data attributes comprise any of data identifications (IDs), data grouping attributes, and data measure attributes, wherein the tagging process comprises inputting the user query, the database metadata for the data attributes in the user query, and attributes specifications; and reducing the number of the tagged data attributes in the data set by logically eliminating data attributes. The method further comprises selecting at least one presentation report for compiling the aggregated data, wherein the selection is based on any of predefined and configurable rules and past user usage; and displaying the at least one presentation report to the user, wherein the displaying process comprises graphically arranging the at least one presentation report based on an available viewing area of a device accessing the at least one presentation report.

Preferably, the set of instructions comprise a structured query language (SQL) data format for processing the set of user-defined instructions; database metadata associated with the data attributes of the computer database system; and user input instructions identifying instructions of how an attribute is to be grouped and presented. The method may further comprise representing the domain metrics as any of database columns and column attributes. Additionally, the method may further comprise categorizing the data relevant to the user query in the data set into non-overlapping data regions. Furthermore, the method may further comprise calculating the number of unique values in the data set associated with a given attribute. Also, the method may further comprise setting a maximum number of combination of the data attributes to be presented in the at least one presentation report; setting a maximum number of datapoints in the data set to be presented in the at least one presentation report; setting a maximum number of the domain metrics; and computing a total number of combination of the tagged data attributes based on the data grouping attributes and data measure attributes.

Moreover, the method may further comprise determining whether the total number of combination of the tagged data attributes is greater than the maximum number of combination of the data attributes. Preferably, the method further comprises determining whether tagged data attributes exist that are not relevant to the user query. Furthermore, the method may further comprise removing the irrelevant tagged data attributes from the data set. Also, the method may further comprise removing the tagged data attributes comprising the highest unique values in the data set. Additionally, for each of the data attributes in the user query, the tagging process may comprise tagging the data attribute as an ID when the attribute is to be treated as an ID based on inputs to any of the computer database system and the database metadata. Moreover, for each of the data attributes in the user query, the tagging process may comprise applying default statistics when user specified statistics are unavailable and tagging the data attribute as a measure when the data attribute is to be treated as a measure based on inputs to any of the computer database system and the database metadata.

Additionally, for each of the data attributes in the user query, the tagging process may comprise tagging the data attribute as a grouping attribute when the data attribute is to be treated as a grouping attribute based on inputs to any of the computer database system and the database metadata. Preferably, when the data attribute comprises a grouping attribute and has a number of unique values less than the maximum numbers of unique values allowed to select a database attribute as a grouping attribute, the tagging process comprises tagging the data attribute as grouping attribute. The method may further comprise applying user defined ranges as grouping ranges and tagging the data attribute as a grouping attribute when the user defined ranges are available for the data attribute. Moreover, the method may further comprise determining appropriate grouping ranges based on a distribution of the data attribute. Also, for each of the data attributes in the user query, the tagging process may comprise checking the data attribute for grouping candidacy and for any available user defined ranges when no information is input as to how the data attribute is to be treated. Additionally, the method may further comprise tagging the data attribute as a grouping attribute when the checking process results in the identification of any of the grouping candidacy and the any available user defined ranges. Furthermore, the method may further comprise tagging the data attribute as a measure with default statistics when the checking process results in no identification of any of the grouping candidacy and the any available user defined ranges.

Another aspect of the embodiments herein provides a system of aggregating and presenting data, wherein the system comprises a user interface adapted to have a set of user-defined instructions and a user query input therein; a computer database system adapted to be mined for data relevant to the user query; a data set comprising the data relevant to the user query; and a logic component adapted to aggregate data in the data set using domain metrics selected based on any of predefined and configurable rules and past user usage, wherein the logic component adapted to aggregate the data comprises a first processing unit adapted to tag all data attributes in the data set based on database metadata and inputs from a user, wherein the data attributes comprise any of data IDs, data grouping attributes, and data measure attributes, wherein the first processing unit is adapted to have the user query, the database metadata for the data attributes in the user query, and attributes specifications being input therein; and a second processing unit adapted to reduce the number of the tagged data attributes in the data set by logically eliminating data attributes. The system further comprises a presentation report generator adapted to select at least one presentation report for compiling the aggregated data, wherein the selection is based on any of predefined and configurable rules and past user usage; and a display unit adapted to (i) display the at least one presentation report to the user, and (ii) graphically arrange the at least one presentation report based on an available viewing area of a device accessing the at least one presentation report.

Preferably, the set of instructions comprise a SQL data format for processing the set of user-defined instructions; database metadata associated with the data attributes of the computer database system; and user input instructions identifying instructions of how an attribute is to be grouped and presented. Additionally, the domain metrics may be represented as any of database columns and column attributes. Also, the logic component is preferably adapted to categorize each the data relevant to the user query in the data set into non-overlapping data regions. Furthermore, the logic component is preferably adapted to calculate the number of unique values in the data set associated with a given attribute. Moreover, the logic component is preferably adapted to set a maximum number of combination of the data attributes to be presented in the at least one presentation report; set a maximum number of datapoints in the data set to be presented in the at least one presentation report; set a maximum number of the domain metrics; and compute a total number of combination of the tagged data attributes based on the data grouping attributes and data measure attributes. Preferably, the logic component is adapted to determine whether the total number of combination of the tagged data attributes is greater than the maximum number of combination of the data attributes.

Additionally, the logic component may be adapted to determine whether tagged data attributes exist that are not relevant to the user query. Also, the second processing unit may be adapted to remove the irrelevant tagged data attributes from the data set. Furthermore, the second processing unit may be adapted to remove the tagged data attributes comprising the highest unique values in the data set. Moreover, for each of the data attributes in the user query, the first processing unit may be adapted to tag the data attribute as an ID when the attribute is to be treated as an ID based on inputs to any of the computer database system and the database metadata. Furthermore, for each of the data attributes in the user query, the first processing unit may be adapted to apply default statistics when user specified statistics are unavailable and tag the data attribute as a measure when the data attribute is to be treated as a measure based on inputs to any of the computer database system and the database metadata.

Also, for each of the data attributes in the user query, the first processing unit may be adapted to tag the data attribute as a grouping attribute when the data attribute is to be treated as a grouping attribute based on inputs to any of the computer database system and the database metadata. Preferably, when the data attribute comprises a grouping attribute and has a number of unique values less than the maximum numbers of unique values allowed to select a database attribute as a grouping attribute, the first processing unit being adapted to tag the data attribute as grouping attribute. Furthermore, the first processing unit may be adapted to apply user defined ranges as grouping ranges and tag the data attribute as a grouping attribute when the user defined ranges are available for the data attribute.

Additionally, the first processing unit may be adapted to determine appropriate grouping ranges based on a distribution of the data attribute. Also, for each of the data attributes in the user query, the first processing unit may be adapted to check the data attribute for grouping candidacy and for any available user defined ranges when no information is input as to how the data attribute is to be treated. Moreover, the first processing unit may be adapted to tag the data attribute as a grouping attribute when the checking process results in the identification of any of the grouping candidacy and the any available user defined ranges. Additionally, the first processing unit may be adapted to tag the data attribute as a measure with default statistics when the checking process results in no identification of any of the grouping candidacy and the any available user defined ranges.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which.

DETAILED DESCRIPTION OF PREFERRED EMBODIMENTS

Figure 1:
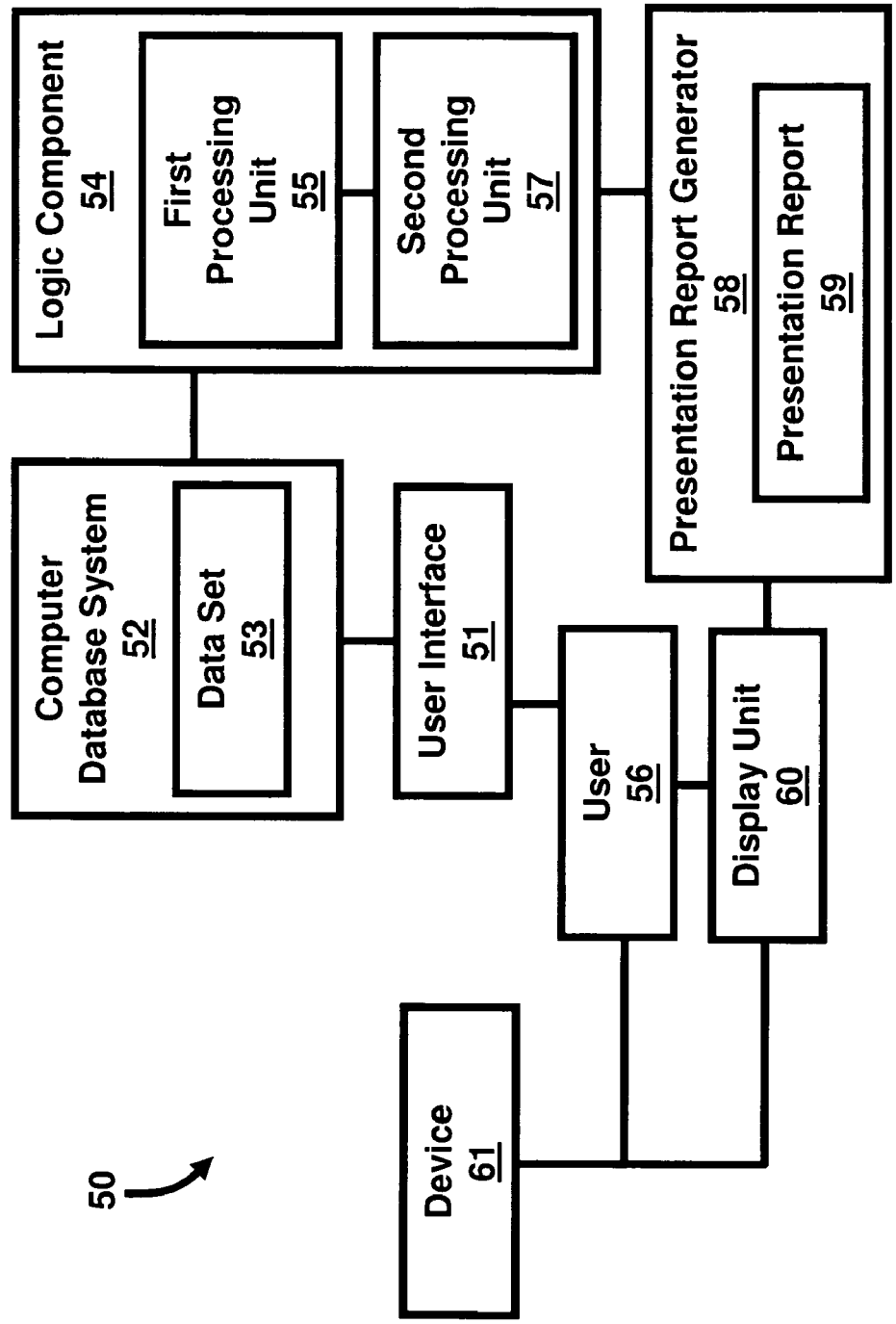
FIG. 1 is a schematic diagram illustrating a system according to an embodiment herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

As mentioned, there remains a need for a novel system and method for aggregating and presenting data to a user that overcomes the limitations of the conventional approaches. The embodiments herein achieve this by providing a domain independent automated system and method for producing concise and presentable reports, and which utilizes a combination of categorical information of the database attributes, database metadata, user inputs and inferred user intent to aggregate detailed data for presentable reporting. Referring now to the drawings, and more particularly to FIGS. 1 through 8, where similar reference characters denote corresponding features consistently throughout the figures, there are shown preferred embodiments.

The following terms, acronyms, and definitions are used within the context of the embodiments herein.

MDDB: Multi-dimensional databases or summary cubes. MDDBs are created by captured common statistics or common business metrics (also referred to as Measures) across common business groupings (also referred to Dimensions). As an explanatory example, consider a census database with 300 million records and five attributes: Citizen Id, State, Sex, Age, and Height. Assuming 50 states and two sexes (male and female), an MDDB with these two dimensions can have up to 153 summary records. To elaborate, 100 of the summary records are generated from the combination of State and Sex; 50 of summary records are generated from State alone; 2 of the summary records are generated from Sex alone; and 1 summary record is generated from neither State nor Sex; i.e., all data. If the count of Citizen IDs, sum of Age, and sum of height is computed for each of these combinations, then the "Average Height" of all 300 citizens can be obtained by scanning the MDDB with only 153 records as opposed 300 million records in the census database. Given aggregated grouping and pre-computed statistics, MDDBs can vastly decrease data access time.

FxDB: Fractional or sampled or approximate database built by taking a representative sample of a larger database, whereby the results from the sampled databases will be approximate. As an explanatory example, consider a 1% sample of the same 300 million record census database. Since the database is much smaller, querying a FxDB can expedite query access times. However, the results can only be approximate wherein some of the challenges of FxDBs arise.

DW: Data Warehouse, also referred to as Full Databases, or FullDB.

Measure: A business metric, domain metric, or a measure attribute. In the case of a MDDB, common statistics are applied on the selected measures. Examples can include business metrics such as sales, revenue, finance charges, fees, etc. and is usually represented as database columns or column attributes.

Dimension: A dimensional or grouping attribute. In the case of a MDDB, common measures are aggregated across frequently used dimensions. Examples include business groupings such as product, state, age, sex, etc. In a data warehouse, a dimension is a data element that categorizes each item in a data set into non-overlapping regions. A dimensional data element is similar to a categorical variable in statistics.

ID Column: Primary, Foreign Keys as defined in a database management system. For example, Account ID, Product ID, etc. Not all statistics can be applied on ID data. For example, AVERAGE or SUM of Account ID is fairly meaningless while NUMBER of Account IDs can mean "number of accounts". This information can be used in report presentations to apply appropriate statistics.

Source Data: Detailed data as obtained from a data repository.

FocusList: List of attributes recognized as the "focus" in the user request.

Select-Measures: Measures from a NLP-Focus list. Not all measures from a SQL are presentable.

UniqueValues (UV): Number of unique values in the result dataset for a given attribute.

Combinations: In a multi-dimensional group, it is the number of groups or combinations calculated as UVGroupAttribute(1)* . . . *UVGroupAttribute(n).

Datapoints: The number of potential data points in a given report presentation. It is calculated as the product of Combinations and Measures from the dataset.

TotalSummary: The resulting dataset when aggregated by all potential grouping candidates.

BusinessUserSummary: The resulting dataset that is usually a subset of TotalSummary, and is aggregated by a subset of grouping candidates. The subset is determined by a Grouping Reduction process.

SummaryDatapoints: The number of Rows*the number of Measures in the Summarized Dataset.

Summarized Data: The data aggregated by all possible GroupBy columns.

Grouping Candidate: An attribute with total unique values fewer than MaxGroupUV and number of unique values less than MaxPctGroupUV of total Records.

FIG. 1 illustrates a block diagram illustrating a system 50 of aggregating and presenting data according to an embodiment herein, wherein the system 50 comprises a user interface 51 adapted to have a set of user-defined instructions and a user query input therein; a computer database system 52 adapted to be mined for data relevant to the user query; a data set 53 comprising the data relevant to the user query; and a logic component 54 adapted to aggregate data in the data set 53 using domain metrics selected based on any of predefined and configurable rules and past user usage, wherein the logic component 54 adapted to aggregate the data comprises a first processing unit 55 adapted to tag all data attributes in the data set 53 based on database metadata and inputs from a user 56, wherein the data attributes comprise any of data IDs, data grouping attributes, and data measure attributes, wherein the first processing unit 55 is adapted to have the user query, the database metadata for the data attributes in the user query, and attributes specifications being input therein; and a second processing unit 57 adapted to reduce the number of the tagged data attributes in the data set 53 by logically eliminating data attributes. The system 50 further comprises a presentation report generator 58 adapted to select at least one presentation report 59 for compiling the aggregated data, wherein the selection is based on any of predefined and configurable rules and past user usage; and a display unit 60 adapted to (i) display the at least one presentation report 59 to the user 56, and (ii) graphically arrange the at least one presentation report 59 based on an available viewing area of a device 61 accessing the at least one presentation report 59.

Preferably, the set of instructions comprise a SQL data format for processing the set of user-defined instructions; database metadata associated with the data attributes of the computer database system 52; and user input instructions identifying instructions of how an attribute is to be grouped and presented. Additionally, the domain metrics may be represented as any of database columns and column attributes. Also, the logic component 54 is preferably adapted to categorize each the data relevant to the user query in the data set 53 into non-overlapping data regions. Furthermore, the logic component 54 is preferably adapted to calculate the number of unique values in the data set 53 associated with a given attribute. Moreover, the logic component 54 is preferably adapted to set a maximum number of combination of the data attributes to be presented in the at least one presentation report 59; set a maximum number of datapoints in the data set 53 to be presented in the at least one presentation report 59; set a maximum number of the domain metrics; and compute a total number of combination of the tagged data attributes based on the data grouping attributes and data measure attributes. Preferably, the logic component 54 is adapted to determine whether the total number of combination of the tagged data attributes is greater than the maximum number of combination of the data attributes.

Additionally, the logic component 54 may be adapted to determine whether tagged data attributes exist that are not relevant to the user query. Also, the second processing unit 57 may be adapted to remove the irrelevant tagged data attributes from the data set 53. Furthermore, the second processing unit 57 may be adapted to remove the tagged data attributes comprising the highest unique values in the data set 53. Moreover, for each of the data attributes in the user query, the first processing unit 55 may be adapted to tag the data attribute as an ID when the attribute is to be treated as an ID based on inputs to any of the computer database system 52 and the database metadata. Furthermore, for each of the data attributes in the user query, the first processing unit 55 may be adapted to apply default statistics when user specified statistics are unavailable and tag the data attribute as a measure when the data attribute is to be treated as a measure based on inputs to any of the computer database system 52 and the database metadata.

Also, for each of the data attributes in the user query, the first processing unit 55 may be adapted to tag the data attribute as a grouping attribute when the data attribute is to be treated as a grouping attribute based on inputs to any of the computer database system 52 and the database metadata. Preferably, when the data attribute comprises a grouping attribute and has a number of unique values less than the maximum numbers of unique values allowed to select a database attribute as a grouping attribute, the first processing unit 55 being adapted to tag the data attribute as grouping attribute. Furthermore, the first processing unit 55 may be adapted to apply user defined ranges as grouping ranges and tag the data attribute as a grouping attribute when the user defined ranges are available for the data attribute.

Additionally, the first processing unit 55 may be adapted to determine appropriate grouping ranges based on a distribution of the data attribute. Also, for each of the data attributes in the user query, the first processing unit 55 may be adapted to check the data attribute for grouping candidacy and for any available user defined ranges when no information is input as to how the data attribute is to be treated. Moreover, the first processing unit 55 may be adapted to tag the data attribute as a grouping attribute when the checking process results in the identification of any of the grouping candidacy and the any available user defined ranges. Additionally, the first processing unit 55 may be adapted to tag the data attribute as a measure with default statistics when the checking process results in no identification of any of the grouping candidacy and the any available user defined ranges.

Generally, the embodiments herein take a set of inputs and use a set of rules and methodologies to identify a set of reports to be generated. The system provided by the embodiments herein can be configured with reasonable initial settings and updated to better suit users by those skilled in the art or may be dynamically configured by the system itself with periodic usage.

Accordingly, the input to the system includes at least one of following inputs: (1) a structured query, a SQL in the case a relational database system, with or without a grouping clause; (2) database metadata for the attributes in the query or access to overall database metadata; and (3) user inputs which can be either explicit inputs by the user as to how an attribute has to be grouped, presented etc. or captured as inferred user intent by another system. Metadata in the context of the embodiments herein include both inputs 2 and 3 described above.

With respect to the system provided by the embodiments herein, the initial settings are:

MaxGroupUV: The maximum numbers of unique values allowed to select a database attribute as a grouping attribute. Conversely, attributes with more than the maximum unique values are not be considered for grouping.

MaxPctGroupUV: The number of unique values from a database attribute must be less than MaxPctGroupUV % of total number of records. This is one more criterion to ensure good candidates for grouping attributes.

MaxStaticCombinations: Summarized data must be concise and this default sets the maximum number of rows or combinations that will be considered for presentations. One of more grouping attributes are dropped when the number of combinations exceeds the set maximum based on a process called the Group-By Reduction Process.

MaxPctStaticCombinations: Represents the percent of aggregation or the ratio of number of aggregated rows to original data. This percentage criterion ensures robust grouping attributes.

MaxStaticMeasures: Since this is automated report generation, it is preferred to have a cap on the number of measures.

MaxGridDPts: Represents the maximum number of data points that will be in an automated report. It may be counterproductive to show too much information.

ExcelSheetMaxRows: This is to ensure that any reports that could be viewed in a Microsoft Excel™ spreadsheet, for example, be shown in total and not exceed the Excel™ spreadsheet row limit of 64,000.

DistributionBands: If the user requests grouping on an attribute that has more than maximum of unique values for a grouping attributes, then a distribution will be produced. This setting allows for the detail of the distribution. For instance, this will be set to 10 if the user wants 10 sub-groups.

DistributionVars: Given automated reporting, it is preferred to set a maximum for the number of distributions to be presented automatically, unless the user requests for more.

TitleAttribute: A GroupByColumn with only one unique value. GroupByColumns with only one unique value are not treated as a GroupByAttribute for Report Selection.

The initial settings can be input by a system administrator or developer. These settings can later be revised by either the system administrator or by an end-user. The settings are designed to be personalized by users.

Figure 2:
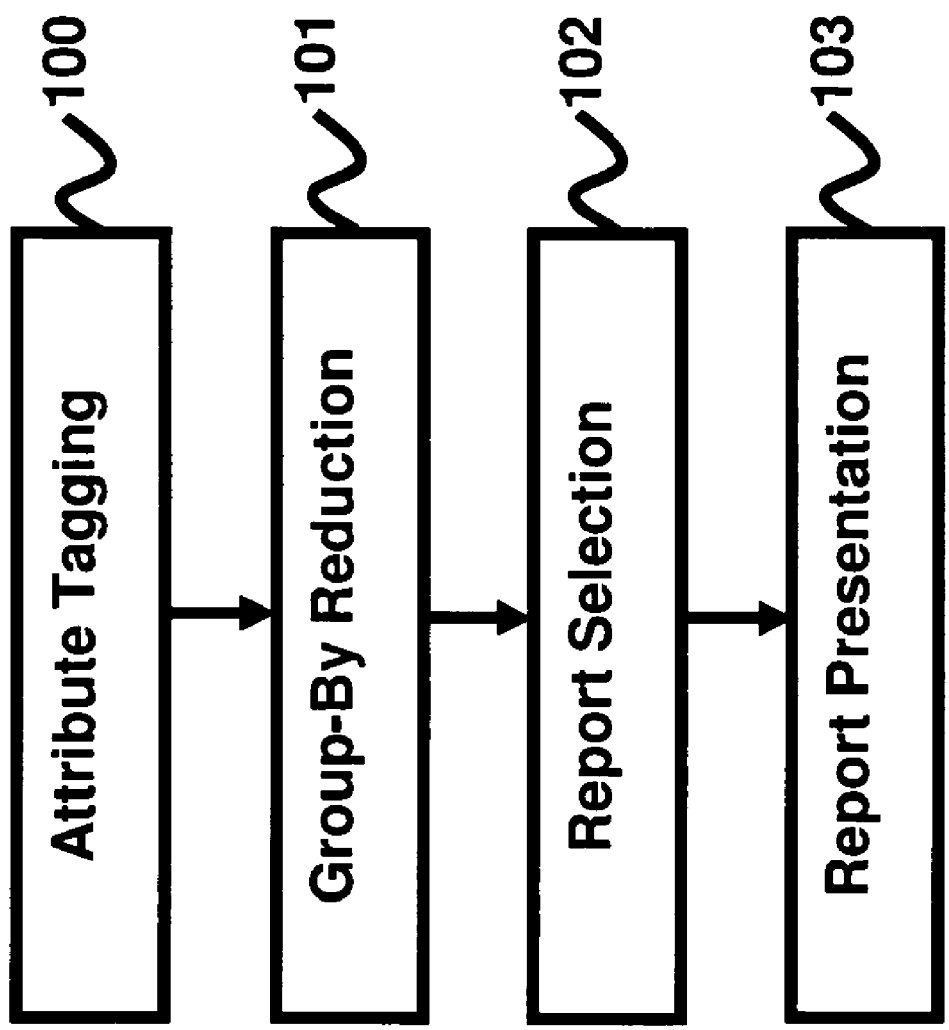
FIGS. 2 through 7 are flow diagrams illustrating preferred methods according to an embodiment herein.

With respect to FIG. 2, in attribute tagging 100, all database attributes in the result dataset are tagged based on database metadata and user inputs. For instance, all key attributes such as Account ID, Product ID, etc. can be recognized as ID attributes based on database metadata. User inputs to the automated report generation may indicate if an attribute were to be treated as a grouping attribute or measure attribute. For example, in the user request "Average Revenue by Product", Revenue is the measure attribute and Product is the grouping attribute.

The process of tagging includes the following steps for each database attribute:

First, if the user indicates that an attribute should be treated as a grouping attribute then the grouping can be accomplished either by available user-defined grouping ranges, or all of its unique values assuming it is a grouping candidate or by dynamically creating grouping ranges based on a distribution. The distribution is driven by the number of ranges which obtained from DistributionBands.

Second, if the user or metadata indicates that the attribute is an ID or database key attribute, then the process ensures that only statistics applied on this attribute be "number of" or COUNT as in SQL.

Third, if the user indicates that an attribute be treated as a measure attribute, then no evaluation is necessary to see if it can be a grouping candidate irrespective of available user defined ranges for that attribute. Also, default statistics are applied for aggregation unless otherwise indicated by the user.

Fourth, in the absence of any user input on how to treat an attribute, the attribute is grouped by user defined grouping ranges, if available, or all its unique values assuming it is a grouping candidate, otherwise it is treated as a measure with default statistics for aggregation unless otherwise indicated by the user.

Fifth, if an attribute is determined to be a grouping candidate and has only one unique value, it can be presented in the title of the report presentation and not in the report data.

When the detailed dataset is large; for example, in the order of tens of thousands or more records, a sample of the result dataset may be accessed and run through to determine the grouping candidates. Aggregation could then be performed on the application database(s) and metadata of the summarized datasets, and either TotalSummary or BusinessUserSummary may be input to the remainder of the system. This minimizes the movement of large amounts of data and improves performance for a large scale application.

Once all attributes are tagged to be either grouping candidates, measures, or IDs, the detailed data or original dataset is summarized by the grouping attributes in a process similar to SAS Proc Summary with all GroupBys in Class statement. If no grouping attributes are recognized then all the detailed data is aggregated based on the preset or user indicated statistics. The process is similar to SAS Proc Summary without Class statement. This aggregated dataset becomes TotalSummary.

Again with respect to FIG. 2, while the detailed data is aggregated by all the grouping attribute candidates, it is essential that the summarized or aggregated information be concise and presentable; i.e. the number of aggregated rows be below MaxStaticCombinations. If the aggregated amount exceeds MaxStaticCombinations, then the aggregated dataset must be further thinned. This is accomplished by reducing grouping attributes 101 that are either not explicitly indicated by the user or the ones with the highest number of unique values until the number of aggregated rows are within MaxStaticCombinations. This reduced aggregated dataset becomes the BusinessUserSummary.

Different data presentations are appropriate for different types of users. Business users or non-technical users prefer presentation-ready reports and charts with a few dimensions. Furthermore, power users may also be interested in multidimensional presentations of tables in which the data may be downloaded. The variety of presentations can include, but are not limited to: GRID, CROSSTAB/Compare Tables, GROUPBY GRID, Single or Multiple BAR and LINE CHARTs, Combination BAR-LINE CHARTS, Multiple AXES BAR-LINE CHARTS, Single or Multiple PIE CHART(S), Pivot Tables, CSV Datasheet/Dataset. Reporting Selection 102 is driven by the grouping attributes, the number of groupings, and number of measures. The reporting selection 102 is fully configurable by users to suit their information needs. For example, if there is one grouping attribute with one measure, a simple bar or line chart may be sufficient and a multi-line or bar chart will better suit a scenario with multiple measures. When the aggregated data has at least two dimensions a pivot table may be useful. With the device specifications and the set of possible reports as inputs, as determined in the Report Selection module 102, the Report Presentation module 103 eliminates reports that cannot be fit within the available viewing area of a device 61 (of FIG. 1) by giving priority to user requested reports that can be appropriately viewed by the device 61. For example, a personal display assistant (PDA) may only be capable of viewing a certain size or format of a presentation report 59 (of FIG. 1) compared with the viewing capacity of a full web browser displayed on a desktop personal computer (PC). The process could also be accomplished based on user preferences or device specific priorities for possible reports. Moreover, the MIN VIEWING AREA of each report 59 (of FIG. 1) could be defined as an initial setting by a database administrator or developer and could be later changed by the user 56 (of FIG. 1).

Figure 3:
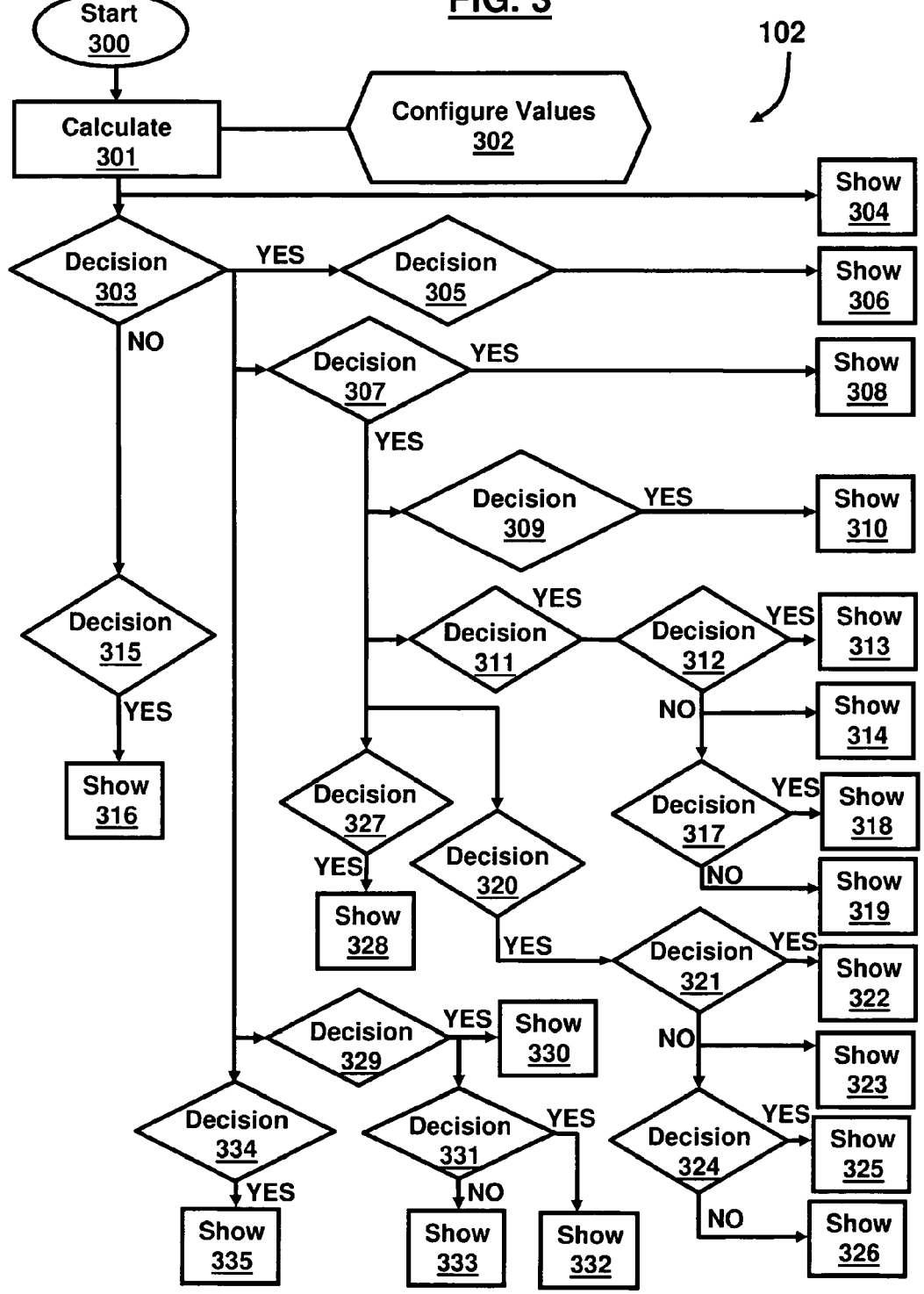

The process of report selection 102 (of FIG. 1) is shown in the flowchart of FIG. 3. To better understand the report selection process 102 (of FIG. 1) within the context of the embodiments herein, additional terminology used is defined below and are calculated 301 at the beginning 300 of the report selection process 102:

NumberOfRecords: The number of records in the summary dataset that is input to the report selection process.

NumberOfGroups: The number of groups in the input summary dataset.

EffectiveGroups: Some groups may have only one member or one unique value. The EffectiveGroups include all groups with more than one member.

NumberOfMeasures: The number of measures in the input summary dataset.

dataPoints: It is calculated as the product of the number of data rows and number of measures. This represents the number of cells required to populate a simple listing of rows and columns.

Additionally, Low, Medium, and High initial settings for dataPoints, Measures, and Groups can be set 302 by an administrator, a developer, or an end-user and can be re-configured by all.

If (decision block 303) number of records is not less than the low-records-limit (NO), and if (decision block 315) the number of groups is ≧2 (YES), then enable a pivot table report(s) 316.

If (decision block 303) number of records is less than the low-records-limit (YES), then the following report selection steps occur:

1. Enable the user to download a CSV dataset 304.
2. If (decision block 305) the number of effectiveGroups=0 (YES), then enable a tabular report 306.
3. Else if (decision block 307) number of effectiveGroups=1 (YES), then a few tables and charts can be enabled as follows:
   a. First enable a simple tabular report(s) 308.
   b. If (decision block 309) the number of groups≧2 and the TotalSummary dataset is larger than BusinessUserSummary (YES), then enable a pivot table report(s) 310.
   c. If (decision block 311) datapoints are less than Low_data_points (YES) and if (decision block 312) the number of measures is less than Low_Measures (YES), then enable bar chart(s) 313, else (NO) enable one or more of multiple line or bar chart(s) or combination bar-line chart(s) 314.
   d. If (decision block 312) the number of measures is not less than Low_Measures (NO) and if (decision block 317) the number of measures is less than Med_Measures (YES), then enable clusterbar charts 318, else (NO) enable combination multiple bar-line chart(s) 319.
   e. If (decision block 320) datapoints are less than Med_data_points (YES) and if (decision block 321) the number of measures equals Low_Measures (YES), then enable line chart(s) 322, else (NO) enable one or more of combination bar-line chart(s) or multiple line chart(s) 323. Alternatively, if (decision block 324) the number of measures is less than Med_Measures (YES), then enable clusterbar chart(s) 325, else (NO) enable combination multiple bar-line chart(s) 326.
   f. If (decision block 327) datapoints are less than High_data_points (YES), then enable one or more of bar-line chart(s), multiple line chart(s), or combination multiple bar-line chart(s) 328.
4. Else if (decision block 329) number of effectiveGroups=2 (YES), then a few tables and charts can be enabled as follows:
   a. First enable cross tabular report(s), group table report(s), and pivot table report(s) 330.
   b. If (decision block 331) datapoints are less than Low_data_points (YES), then enable cross bar report(s) 332, else (NO) enable cross line report(s) 333.
5. Else if (decision block 334) number of effectiveGroups>2 (YES), then enable pivot table report(s) and group table report(s) 335.

The flowcharts and process of report selection is an illustration of automating report selection and it is within the scope of the embodiments herein to extend the suite of reports to any suitable reports.

The outputs of the system include the following:

Presentation logic—using a process similar to Report Selection 102, report presentations can be chosen or arranged based on the device or available viewing area. For example, a user may be attempting to understand "monthly sales by BillingBalance". Suppose a simple SQL such as "SELECT TOTAL_SALES_AMT, ACCOUNT_ID, BILL_MONTH, BILL_BALANCE FROM BillingMain" is input into the system. Suppose the database query results in 120,000 detailed rows. Moreover, suppose it is also input to the system that a BILL_BALANCE must be grouped into a few groupings. Suppose the system is aware that ACCOUNT_ID is an ID attribute from database metadata.

Here, with respect to attribute tagging 100, Account_ID is tagged ID based on the database metadata. Given no user specified attribute tag is unavailable for BILL_MONTH, the system checks the number of unique values. Suppose there are 24. If it is less than MaxGroupUV then it will be treated as grouping attributes. Suppose some user specified attribute tag is available, then tag BILL_MONTH as the grouping attribute.

Given a user input that BILL_BALANCE is grouped into sub-groupings, the system checks unique values. Suppose there are 5000 and it is more than MaxGroupUV. Next, the system checks if a user defined grouping is available for BILL_BALANCE. Suppose one exists such as: BILL_BALANCE_GROUPS (Less than 1000, 1000 to 2500, 2500 to 5000, 5000 or more). The system applies this user defined ranges and rebuilds the SQL accordingly.

Given that the user does not specify any attribute tag for TOTAL_SALES_AMT, then the system checks for unique values, and then for user defined ranges. If unique values are more than MaxGroupUV and no user defined ranges exist, it will be tagged a measure with a default statistic. If it is tagged a measure then no checking for grouping is necessary.

Following attribute tagging, ACCOUNT_ID is tagged ID, BILL_MONTH is Grouping, BILL_BALANCE is Grouping and TOTAL_SALES_AMT is tagged to a measure. Next, in grouping attribute reduction 101, given four members for BILL_BALANCE and 24 members for BILL_MONTH the number of summary records is 96. No reduction of the grouping attributes is required if the number of records is within MaxStaticCombinations. Then, the aggregated data is passed to the Reporting Selection 102.

Here, given two dimensions, the system can present a multiple line or bar chart with a line or set of bars representing each sub-grouping of BILL_BALANCE. A listing may also be presented given the concise data of up to 96 records. As previously described the system can aggregate detailed records into concise data for meaningful presentations. In this case, 120,000 records are aggregated into 96 summary records and later presented as three presentations.

Furthermore, additional checks and rules can be incorporated into each of the three stages of attribute tagging 100, group by reduction 101, and report selection 102 to improve the system and may be incorporated accordingly. This includes the treatment of ID, Measures, and GroupBy attributes. Additionally, determining sub-groupings based on attribute distributions and other methods of identifying groupings can be employed in accordance with the embodiments herein.

Figure 4:
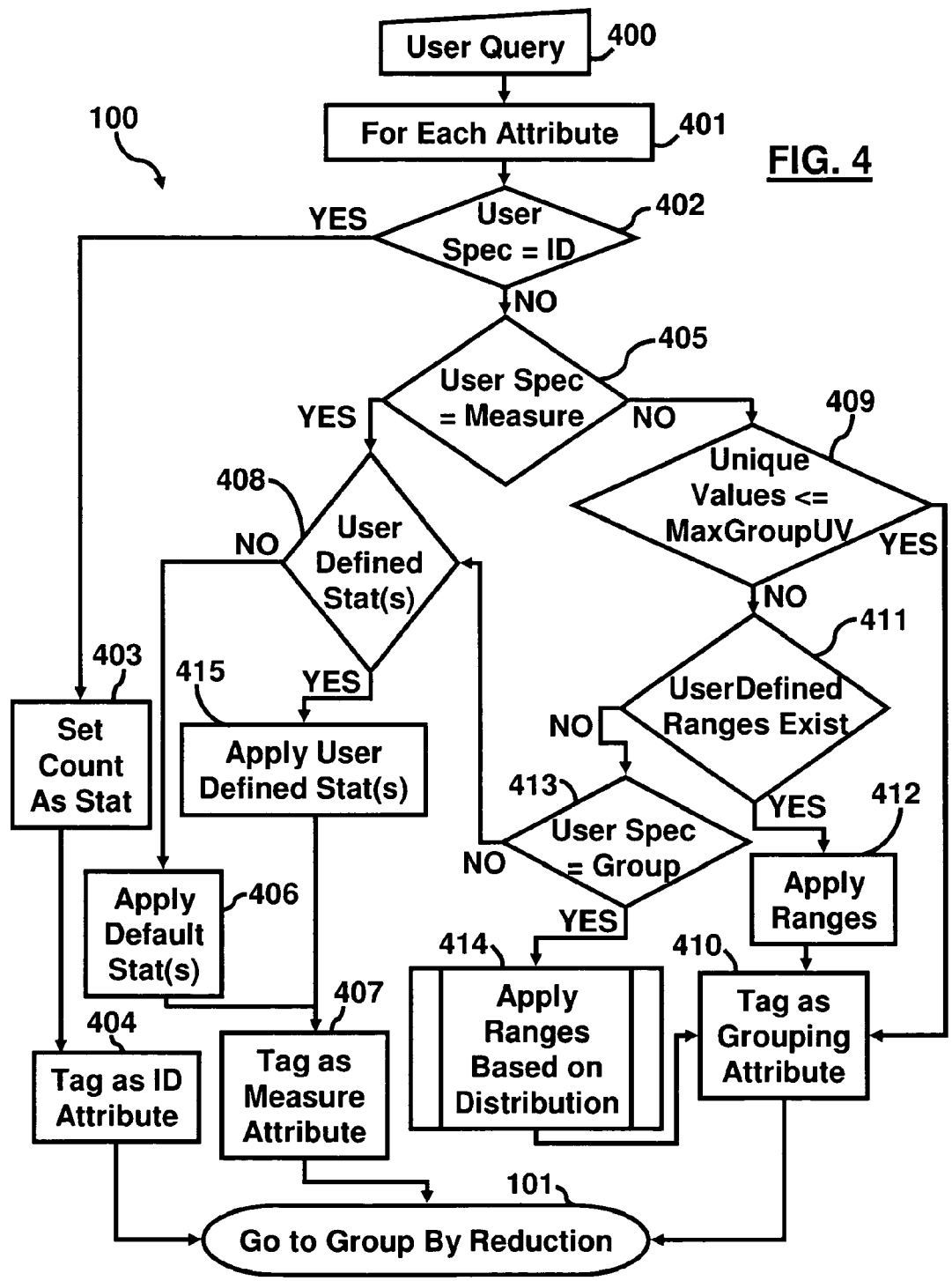

FIG. 4 is a flow diagram illustrating a process of tagging (step 100 in FIG. 2) each database attribute as an ID, Group By, Measure or Title attribute according to an embodiment herein. The inputs to the tagging process include user query 400, database metadata for the attributes 401 in the user query 400, and any other attributes 401 specifications captured prior to this process. The tagging process is as follows:

For each attribute 401 in the user query 400:

If (decision block 402) the attribute 401 is to be treated as an ID (YES), based on inputs to the system or database metadata, then tag the attribute 401 as an ID 404 after setting 403 statistic to Count as in Select Count (ID-Attribute) from Tables in an SQL query. Alternatively (NO), if (decision block 405) the attribute 401 is to be treated as a measure, based on inputs to the system or database metadata, then apply 406 default statistics if (decision block 408) user specified statistics are not available (NO) and tag 407 the attribute 401 as a measure and set statistic to count as in Select Count (ID-Attribute) from Tables in an SQL query. If (decision block 408) if the user defined statistics are available (YES), then the user defined statistics are applied 415 and the attribute 401 is tagged 407 as a measure. Still alternatively, if (decision block 405) the attribute 401 is to be treated as a grouping attribute (NO), based on inputs to the system or database metadata, then the following steps occur:

If (decision block 409) the attribute 401 it is a Grouping Candidate (YES); i.e., it has a number of unique values less than MaxGroupUV, then tag 410 the attribute 401 as a grouping attribute, else (NO) if (decision block 411) the user defined ranges are available for this database attribute (YES), apply 412 these ranges as the grouping ranges and tag it as a grouping attribute, else (NO) determine if (decision block 413) appropriate grouping ranges based on the distribution of the attribute 401 exist. If they exist (YES), then apply 414 the ranges based on the distribution. If not (NO), then determine the user defined statistics (decision block 408). For example, "A Proc Univariate" or "Proc Rank" are some of the procedures in SAS programming that can be utilized to determine ranges. Those skilled in the art can use other methods of categorical or clustering analysis to determine the ranges, and such methods are within the scope of the embodiments herein. The distribution is driven by DistributionBands, which is an initial setting indicating the number of ranges or groups to be created unless otherwise specified by a user.

Still alternatively, for each attribute 401 in the user query 400, if no information is input as to how the attribute 401 is to be treated, then the attribute 401 will be checked (decision block 409) for grouping candidacy and for any available user defined ranges. If yes (YES), the attribute 401 will be tagged 410 as a grouping attribute. If not (NO), it is treated 411 as a measure with default statistics. The sequence of some of the checks can be changed to meet specific user requirements. For example, the process can be changed to check for user defined ranges only if there is specific input suggesting the attribute 401 be treated as a grouping attribute.

Figure 5:
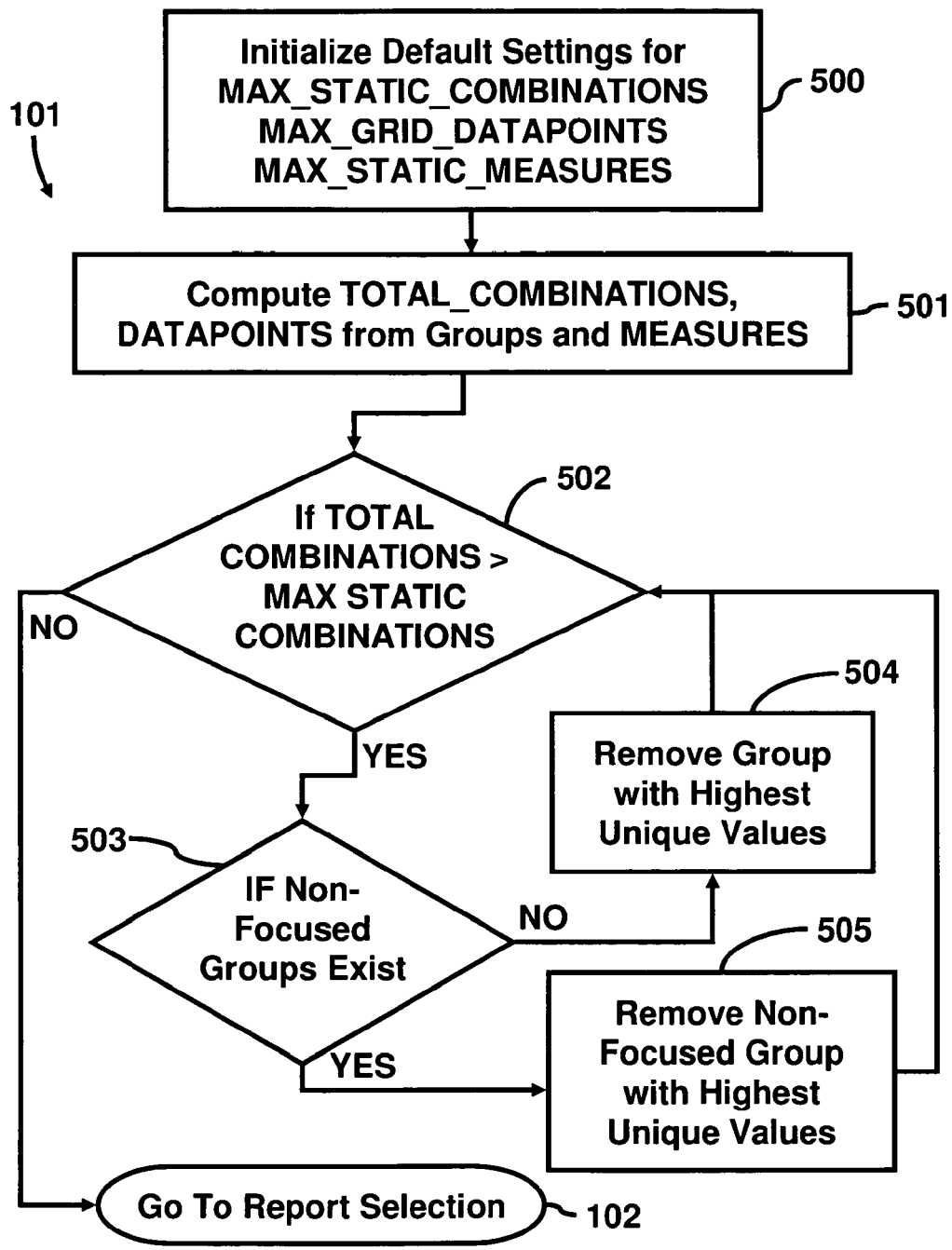

While the detailed data is aggregated by all the grouping attribute candidates, it is important that the summarized or aggregated information be concise and presentable; i.e., the number of aggregated rows be within MaxStaticCombinations. If it exceeds MaxStaticCombinations, then the aggregated dataset is thinned using the Grouping Attribute Reduction Process 101. The flowchart in FIG. 5 shows the Grouping Attribute Reduction Process 101 (of FIGS. 2 and 4) in greater detail in accordance with the embodiments herein. Here, the inputs to the Grouping Attribute Reduction Process 101 include metadata of the TotalSummary dataset 500, 501; i.e., number of rows, attributes, grouping attributes, id attributes, etc. If (decision block 502) the number of rows in the Total-Summary is less (NO) than MaxStaticCombinations, then proceed to the Report Selection Process 102. If (decision block 502) the number of rows in the TotalSummary is more (YES) than MaxStaticCombinations, then eliminate one or more groups until the resulting summary is within MaxStaticCombinations as follows:

If (decision block 503) one or more non-focused grouping attributes; i.e., grouping attributes not specifically mentioned by the user to be treated as grouping attributes exist (YES), then eliminate 505 the one with the highest number of unique values. Else (NO) eliminate 504 the grouping attribute with the highest number of unique values. The summary dataset obtained by aggregating detailed data using this shorter list of grouping attributes will become BusinessUserSummary. This dataset will have fewer or more concise information than the TotalSummary dataset with all the grouping attributes. This process can also be extended to reducing the number of measures as well based on the FocusList to generate a concise BusinessUserSummary dataset.

Figure 6:
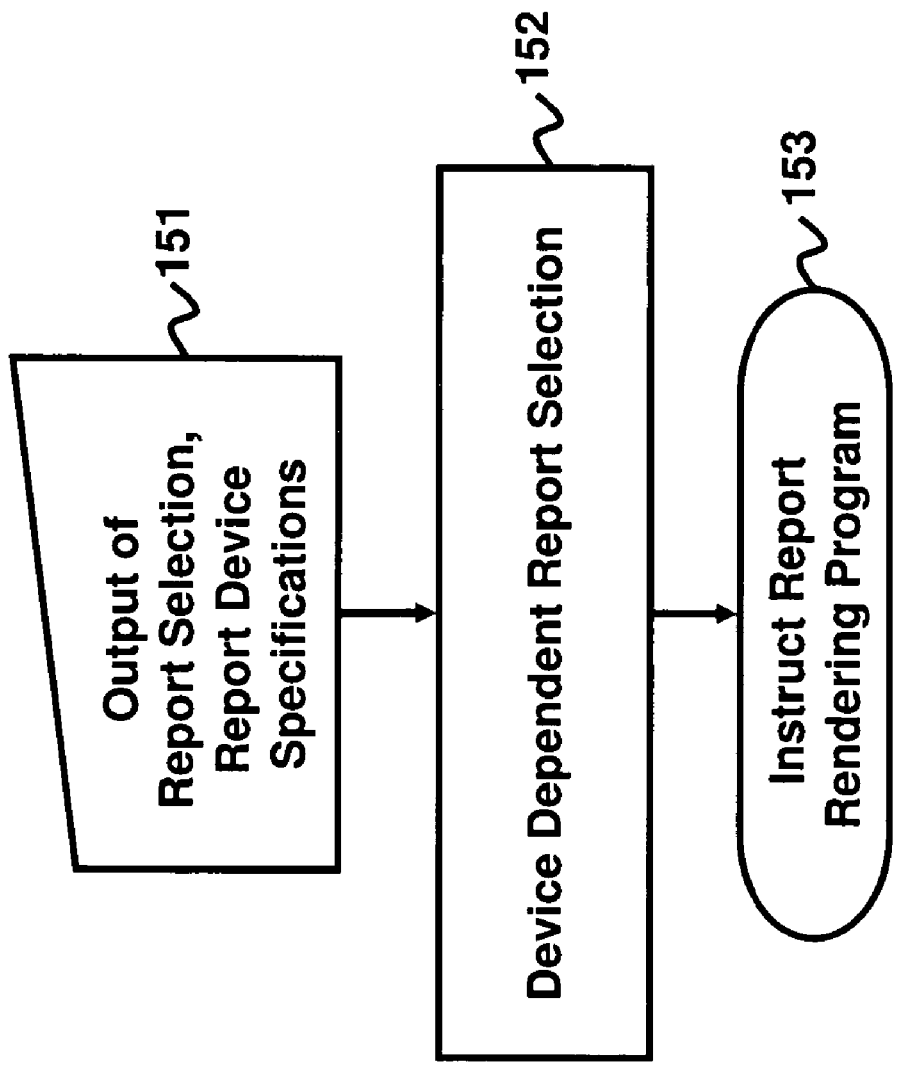

In FIG. 6, the interaction of the Report Selection module 102 and Report Presentation module 103 (of FIG. 2) is further illustrated. Here, the output of the Report Selection 102 is combined (151) with the specifications of the report device 61 (of FIG. 1). These specifications relate to the viewing capacity of the particular device 61. Next, the device dependent report selection is generated (152) followed by instructions given (153) for the report rendering program (i.e., program to generate the report 59 to the appropriate device 61 (of FIG. 1)).

Figure 7:
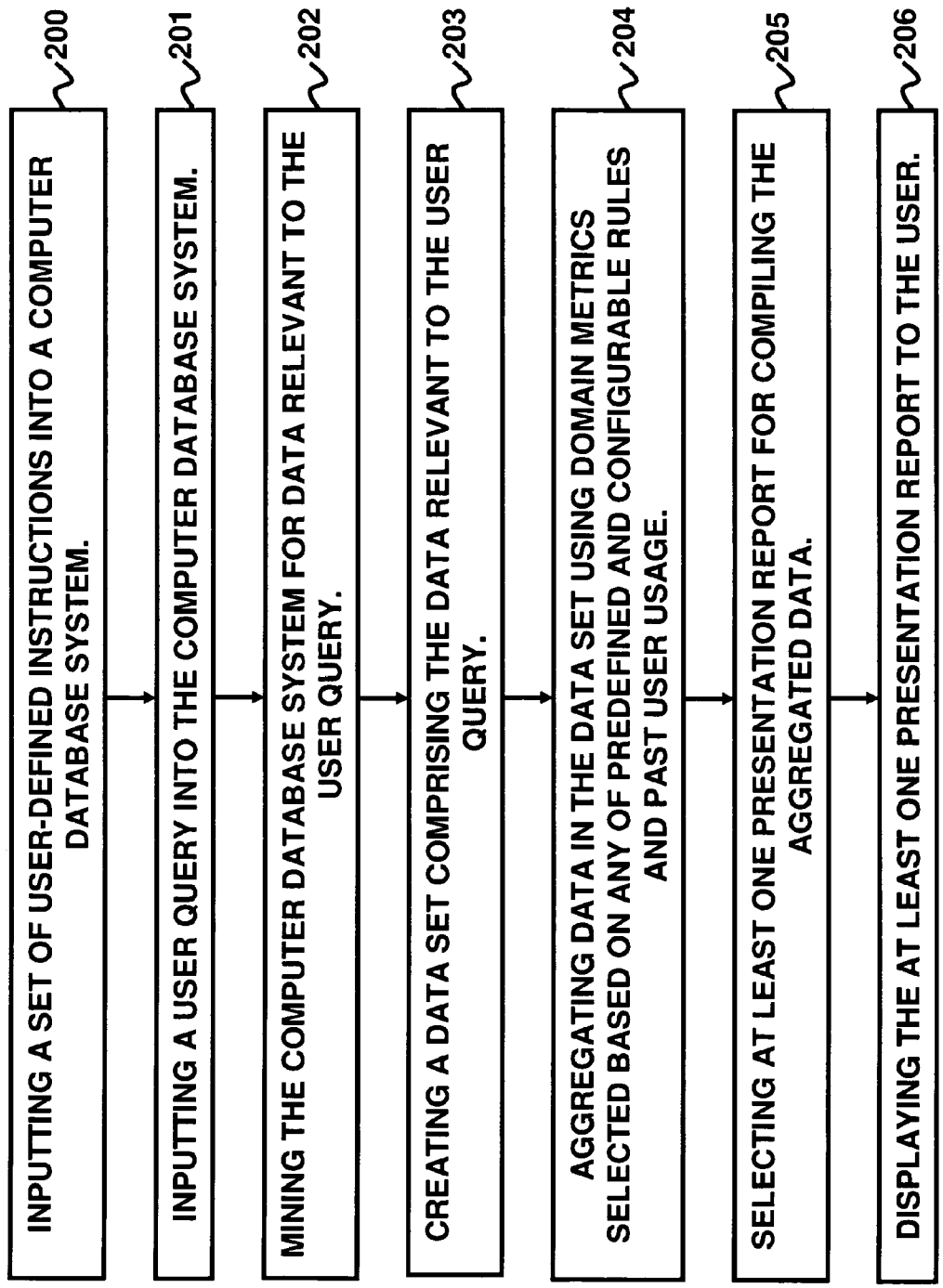

FIG. 7, with respect to FIGS. 1 through 6, illustrates a flow diagram of a computer automated method of aggregating and presenting data according to an embodiment herein, wherein the method comprises inputting (200) a set of user-defined instructions into a computer database system 52; inputting (201) a user query into the computer database system 52; mining (202) the computer database system 52 for data relevant to the user query; creating (203) a data set 53 comprising the data relevant to the user query; and aggregating (204) data in the data set 53 using domain metrics selected based on any of predefined and configurable rules and past user usage, wherein the aggregation comprises tagging all data attributes in the data set 53 based on database metadata and inputs from a user 56, wherein the data attributes comprise any of data identifications (IDs), data grouping attributes, and data measure attributes, wherein the tagging process comprises inputting the user query, the database metadata for the data attributes in the user query, and attributes specifications; and reducing the number of the tagged data attributes in the data set 53 by logically eliminating data attributes. The method further comprises selecting (205) at least one presentation report 59 for compiling the aggregated data, wherein the selection is based on any of predefined and configurable rules and past user usage; and displaying (206) the at least one presentation report 59 to the user 56, wherein the displaying process (206) comprises graphically arranging the at least one presentation report 59 based on an available viewing area of a device 61 accessing the at least one presentation report 59.

Preferably, the set of instructions comprise a SQL data format for processing the set of user-defined instructions; database metadata associated with the data attributes of the computer database system 52; and user input instructions identifying instructions of how an attribute is to be grouped and presented. The method may further comprise representing the domain metrics as any of database columns and column attributes. Additionally, the method may further comprise categorizing each the data relevant to the user query in the data set 53 into non-overlapping data regions. Furthermore, the method may further comprise calculating the number of unique values in the data set 53 associated with a given attribute. Also, the method may further comprise setting a maximum number of combination of the data attributes to be presented in the at least one presentation report 59; setting a maximum number of datapoints in the data set 53 to be presented in the at least one presentation report 59; setting a maximum number of the domain metrics; and computing a total number of combination of the tagged data attributes based on the data grouping attributes and data measure attributes.

Moreover, the method may further comprise determining whether the total number of combination of the tagged data attributes is greater than the maximum number of combination of the data attributes. Preferably, the method further comprises determining whether tagged data attributes exist that are not relevant to the user query. Furthermore, the method may further comprise removing the irrelevant tagged data attributes from the data set 53. Also, the method may further comprise removing the tagged data attributes comprising the highest unique values in the data set 53. Additionally, for each of the data attributes in the user query, the tagging process may comprise tagging the data attribute as an ID when the attribute is to be treated as an ID based on inputs to any of the computer database system 52 and the database metadata. Moreover, for each of the data attributes in the user query, the tagging process may comprise applying default statistics when user specified statistics are unavailable and tagging the data attribute as a measure when the data attribute is to be treated as a measure based on inputs to any of the computer database system 52 and the database metadata.

Additionally, for each of the data attributes in the user query, the tagging process may comprise tagging the data attribute as a grouping attribute when the data attribute is to be treated as a grouping attribute based on inputs to any of the computer database system 52 and the database metadata. Preferably, when the data attribute comprises a grouping attribute and has a number of unique values less than the maximum numbers of unique values allowed to select a database attribute as a grouping attribute, the tagging process comprises tagging the data attribute as grouping attribute. The method may further comprise applying user defined ranges as grouping ranges and tagging the data attribute as a grouping attribute when the user defined ranges are available for the data attribute. Moreover, the method may further comprise determining appropriate grouping ranges based on a distribution of the data attribute. Also, for each of the data attributes in the user query, the tagging process may comprise checking the data attribute for grouping candidacy and for any available user defined ranges when no information is input as to how the data attribute is to be treated. Additionally, the method may further comprise tagging the data attribute as a grouping attribute when the checking process results in the identification of any of the grouping candidacy and the any available user defined ranges. Furthermore, the method may further comprise tagging the data attribute as a measure with default statistics when the checking process results in no identification of any of the grouping candidacy and the any available user defined ranges.

The embodiments herein can take the form of an entirely hardware embodiment, an entirely software embodiment or an embodiment including both hardware and software elements. A preferred embodiment is implemented in software, which includes but is not limited to firmware, resident software, microcode, etc.

Furthermore, the embodiments herein can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 8:
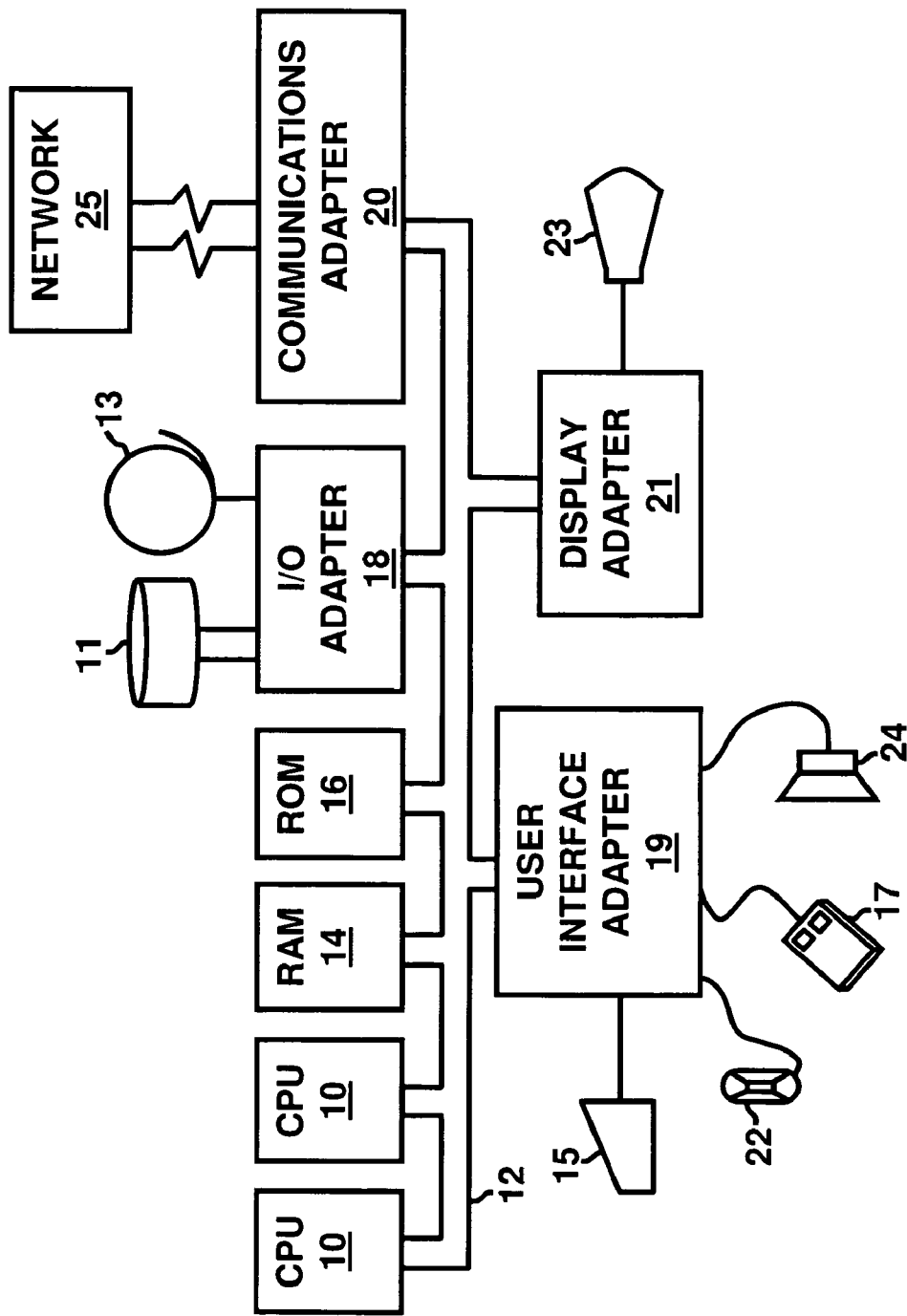
FIG. 8 is a schematic diagram illustrating a computer system according to an embodiment herein.

A representative hardware environment for practicing the embodiments herein is depicted in FIG. 8. This schematic drawing illustrates a hardware configuration of an information handling/computer system in accordance with the embodiments herein. The system comprises at least one processor or central processing unit (CPU) 10. The CPUs 10 are interconnected via system bus 12 to various devices such as a RAM 14, ROM 16, and an I/O adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of the embodiments herein. The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A computer automated method of aggregating and presenting data, said method comprising:
    inputting a set of user-defined instructions into a remotely located computer database system via a public network connection;
    inputting a user query into said computer database system via said public network connection, the user query comprising one or more data attributes;
    mining said computer database system for data relevant to said user query;
    creating a data set comprising said data relevant to said user query;
    aggregating data in said data set using domain metrics selected based on any of predefined and configurable rules and past user usage, wherein the aggregation comprises:
        tagging all data attributes in said data set based on database metadata and inputs from a user, wherein said data attributes comprise any of data identifications (IDs), data grouping attributes, and data measure attributes, wherein the tagging process comprises inputting said user query, database metadata for said data attributes in said user query, and attributes specifications; and
        reducing the number of the tagged data attributes in said data set by logically eliminating data attributes;
    selecting at least one presentation report for compiling the aggregated data, wherein the selection is based on any of predefined and configurable rules and past user usage; and
    displaying said at least one presentation report to said user via said public network, wherein the displaying process comprises graphically arranging said at least one presentation report based on an available viewing area of a device accessing said at least one presentation report;
    wherein for each of said data attributes in said user query, said tagging process comprises tagging the data attribute as a grouping attribute when said data attribute is to be treated as a grouping attribute based on inputs to any of said computer database system and said database metadata; and
    wherein when said data attribute comprises a grouping attribute and has a number of unique values less than the maximum numbers of unique values allowed to select a database attribute as a grouping attribute, said tagging process comprises tagging said data attribute as a grouping attribute.

2. The method of claim 1, all the limitations of which are incorporated herein by reference, wherein said set of user-defined instructions comprise:
    a structured query language (SQL) data format for processing said set of user-defined instructions;
    database metadata associated with said data attributes of said computer database system; and
    user input instructions identifying instructions of how an attribute is to be grouped and presented.

3. The method of claim 2, all the limitations of which are incorporated herein by reference, further comprising representing said domain metrics as any of database columns and column attributes.

4. The method of claim 3, all the limitations of which are incorporated herein by reference, further comprising categorizing each said data relevant to said user query in said data set into non-overlapping data regions.

5. The method of claim 4, all the limitations of which are incorporated herein by reference, further comprising calculating a number of unique values in said data set associated with a given attribute.

6. The method of claim 5, all the limitations of which are incorporated herein by reference, further comprising:
    setting a maximum number of combination of said data attributes to be presented in said at least one presentation report;
    setting a maximum number of datapoints in said data set to be presented in said at least one presentation report;
    setting a maximum number of said domain metrics; and
    computing a total number of combination of the tagged data attributes based on said data grouping attributes and data measure attributes.

7. The method of claim 6, all the limitations of which are incorporated herein by reference, further comprising determining whether said total number of combination of said tagged data attributes is greater than said maximum number of combination of said data attributes.

8. The method of claim 7, all the limitations of which are incorporated herein by reference, further comprising determining whether tagged data attributes exist that are not relevant to said user query.

9. The method of claim 8, all the limitations of which are incorporated herein by reference, further comprising removing the irrelevant tagged data attributes from said data set.

10. The method of claim 8, all the limitations of which are incorporated herein by reference, further comprising removing said tagged data attributes comprising the highest number of said unique values in said data set.

11. The method of claim 1, all the limitations of which are incorporated herein by reference, wherein for each of said data attributes in said user query, said tagging process comprises tagging the data attribute as an ID when said attribute is to be treated as an ID based on inputs to any of said computer database system and said database metadata.

12. The method of claim 1, all the limitations of which are incorporated herein by reference, wherein for each of said data attributes in said user query, said tagging process comprises applying default statistics when user specified statistics are unavailable and tagging the data attribute as a measure when said data attribute is to be treated as a measure based on inputs to any of said computer database system and said database metadata.

13. The method of claim 1, all the limitations of which are incorporated herein by reference, further comprising applying user defined ranges as grouping ranges and tagging said data attribute as a grouping attribute when said user defined ranges are available for said data attribute.

14. The method of claim 13, all the limitations of which are incorporated herein by reference, further comprising determining appropriate grouping ranges based on a distribution of said data attribute.

15. The method of claim 1, all the limitations of which are incorporated herein by reference, wherein for each of said data attributes in said user query, said tagging process comprises checking the data attribute for grouping candidacy and for any available user defined ranges when no information is input as to how said data attribute is to be treated.

16. The method of claim 15, all the limitations of which are incorporated herein by reference, further comprising tagging said data attribute as a grouping attribute when the checking process results in the identification of any of said grouping candidacy and said any available user defined ranges.

17. The method of claim 15, all the limitations of which are incorporated herein by reference, further comprising tagging said data attribute as a measure with default statistics when the checking process results in no identification of any of said grouping candidacy and said any available user defined ranges.

18. A program storage device readable by computer located at a remote computer database system, tangibly embodying a program of instructions executable by said computer to perform an automated method of aggregating and presenting data, said method comprising:

inputting a set of user-defined instructions into a remote computer database system via a public network connection;

inputting a user query into said remote computer database system via said public network connection, the user query comprising one or more data attributes;

mining said computer database system for data relevant to said user query;

creating a data set comprising said data relevant to said user query;

aggregating data in said data set using domain metrics selected based on any of predefined and configurable rules and past user usage, wherein the aggregation comprises:

tagging all data attributes in said data set based on database metadata and inputs from a user, wherein said data attributes comprise any of data identifications (IDs), data grouping attributes, and data measure attributes, wherein the tagging process comprises inputting said user query, said database metadata for said data attributes in said user query, and attributes specifications; and reducing the number of the tagged data attributes in said data set by logically eliminating data attributes;

selecting at least one presentation report for compiling the aggregated data, wherein the selection is based on any of predefined and configurable rules and past user usage; and displaying said at least one presentation report to said user via said public network connection, wherein the displaying process comprises graphically arranging said at least one presentation report based on an available viewing area of a device accessing said at least one presentation report;

wherein for each of said data attributes in said user query, said tagging process comprises tagging the data attribute as a grouping attribute when said data attribute is to be treated as a grouping attribute based on inputs to any of said computer database system and said database metadata; and wherein when said data attribute comprises a grouping attribute and has a number of unique values less than the maximum numbers of unique values allowed to select a database attribute as a grouping attribute, said tagging process comprises tagging said data attribute as a grouping attribute.

19. A system of aggregating and presenting data, said system comprising:

a user interface configured to have a set of user-defined instructions and a user query input therein, the user query comprising one or more data attributes;

a computer database system, located at a remote location and maintained in contact with said user interface via a public network connection, adapted to be mined for data relevant to said user query;

a data set comprising said data relevant to said user query;

a logic component configured to aggregate data in said data set using domain metrics selected based on any of predefined and configurable rules and past user usage, wherein said logic component configured to aggregate said data comprises:

a first processing unit configured to tag all data attributes in said data set based on database metadata and inputs from a user, wherein said data attributes comprise any of data identifications (IDs), data grouping attributes, and data measure attributes, wherein said first processing unit is configured to receive said user query, said database metadata for said data attributes in said user query, and attributes specifications being input therein; and a second processing unit configured to reduce the number of the tagged data attributes in said data set by logically eliminating data attributes;

a presentation report generator configured to select at least one presentation report for compiling the aggregated data, wherein the selection is based on any of predefined and configurable rules and past user usage; and a display unit configured to (i) display said at least one presentation report received from said computer system via said public network to said user, and (ii) graphically arrange said at least one presentation report based on an available viewing area of a device accessing said at least one presentation report;

wherein for each of said data attributes in said user query, said first processing unit is configured to tag the data attribute as an ID when said attribute is to be treated as an ID based on inputs to any of said computer database system and said database metadata, wherein for each of said data attributes in said user query, said first processing unit is configured to apply default statistics when user specified statistics are unavailable and tag the data attribute as a measure when said data attribute is to be treated as a measure based on inputs to any of said computer database system and said database metadata, wherein for each of said data attributes in said user query, said first processing unit is configured to tag the data attribute as a grouping attribute when said data attribute is to be treated as a grouping attribute based on inputs to any of said computer database system and said database metadata, wherein when said data attribute comprises a grouping attribute and has a number of unique values less than the maximum number of unique values allowed to select a database attribute as a grouping attribute, said first processing unit being configured to tag said data attribute as a grouping attribute, wherein said first processing unit is configured to apply user defined ranges as grouping ranges and tag said data attribute as a grouping attribute when said user defined ranges are available for said data attribute, and wherein said first processing unit is configured to determine appropriate grouping ranges based on a distribution of said data attribute.

20. The system of claim 19, all the limitations of which are incorporated herein by reference, wherein said set of user-defined instructions comprise:
- a structured query language (SQL) data format for processing said set of user-defined instructions;
- database metadata associated with said data attributes of said computer database system; and
- user input instructions identifying instructions of how an attribute is to be grouped and presented,
- wherein said domain metrics are represented as any of database columns and column attributes,
- wherein said logic component is configured to categorize each said data relevant to said user query in said data set into non-overlapping data regions, and
- wherein said logic component is configured to calculate a number of unique values in said data set associated with a given attribute.

21. The system of claim 19, all the limitations of which are incorporated herein by reference, wherein said logic component is configured to:
- set a maximum number of combination of said data attributes to be presented in said at least one presentation report;
- set a maximum number of datapoints in said data set to be presented in said at least one presentation report;
- set a maximum number of said domain metrics; and
- compute a total number of combination of the tagged data attributes based on said data grouping attributes and data measure attributes,
- wherein said logic component is configured to determine whether said total number of combination of said tagged data attributes is greater than said maximum number of combination of said data attributes,
- wherein said logic component is configured to determine whether tagged data attributes exist that are not relevant to said user query,
- wherein said second processing unit is configured to remove the irrelevant tagged data attributes from said data set, and
- wherein said second processing unit is configured to remove said tagged data attributes comprising the highest number of said unique values in said data set.

* * * * *